(12) United States Patent
Donehue

(10) Patent No.: US 9,043,357 B2
(45) Date of Patent: *May 26, 2015

(54) SYSTEM AND METHOD FOR IDENTIFYING A COMPONENT FOR A TIRE PRESSURE MONITORING SYSTEM

(71) Applicant: Tiremetrix LLC, Brighton, MI (US)

(72) Inventor: Joseph William Donehue, Brighton, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/306,437

(22) Filed: Jun. 17, 2014

(65) Prior Publication Data

US 2014/0327534 A1 Nov. 6, 2014

Related U.S. Application Data

(63) Continuation of application No. 13/438,348, filed on Apr. 3, 2012, now Pat. No. 8,768,955.

(60) Provisional application No. 61/472,369, filed on Apr. 6, 2011.

(51) Int. Cl.
| | |
|---|---|
| *G06F 17/30* | (2006.01) |
| *B60C 23/02* | (2006.01) |
| *G06Q 10/08* | (2012.01) |
| *G06Q 30/06* | (2012.01) |
| *G06F 3/0484* | (2013.01) |
| *B60C 23/04* | (2006.01) |

(52) U.S. Cl.
CPC .......... *B60C 23/02* (2013.01); *G06F 17/30389* (2013.01); *G06Q 10/0875* (2013.01); *G06Q 30/0603* (2013.01); *G06F 3/0484* (2013.01); *B60C 23/0471* (2013.01); *B60C 23/0479* (2013.01)

(58) Field of Classification Search
CPC ................. G06F 17/30424; G06F 17/30598
USPC .......................................... 707/769
See application file for complete search history.

(56) References Cited

U.S. PATENT DOCUMENTS

| 7,104,438 B2 | 9/2006 | Benedict | |
|---|---|---|---|
| 2003/0055812 A1* | 3/2003 | Williams et al. .................. | 707/1 |
| 2008/0040268 A1* | 2/2008 | Corn ............................... | 705/40 |

(Continued)

OTHER PUBLICATIONS

"Dill Air Control Products", http://dillaircontrols.com/dill/, pp. 1-24 dated Apr. 3, 2012.

(Continued)

*Primary Examiner* — Rehana Perveen
*Assistant Examiner* — Alexander Khong
(74) *Attorney, Agent, or Firm* — Peter J. Rashid

(57) ABSTRACT

A system and method for identifying a component, such as a sensor, for a Tire Pressure Monitoring System (TPMS) to be replaced for a vehicle of interest by performing a Quick Search or an Advanced Search of a TPMS Manager database. In the Quick Search, the user inputs year/make/model (Y/M/M) or Vehicle Identification Number (VIN). In the Advanced Search, the user inputs various physical attributes of the component to be replaced. All related superseded, alias or interchange parts with like communication or physical structure and relevant service components are determined and the results displayed to the user. A relearn procedure for the replacement TPMS component for the vehicle of interest identifies and validates scan tool compatibility. A report to the user of a cause/failure analysis of the component to be replaced can be displayed.

17 Claims, 17 Drawing Sheets
(17 of 17 Drawing Sheet(s) Filed in Color)

(56) References Cited

U.S. PATENT DOCUMENTS

| | | | |
|---|---|---|---|
| 2008/0147271 A1* | 6/2008 | Breed | 701/36 |
| 2009/0267751 A1* | 10/2009 | Wittliff et al. | 340/442 |
| 2010/0066525 A1* | 3/2010 | Kochie | 340/447 |

OTHER PUBLICATIONS

"VDO ATE Online Parts Catalog", http://www.showmetheparts.com/ate/, pp. 1 and 2 dated Apr. 3, 2012.

"BWD eCatalog", http://bwdbrand.com/Online%20%20Catalogs-eCatalog/Content.aspx, 1 page dated Apr. 3, 2012.

"Alligator sens.it", http://www.alligator-sensit.com/start.html , 1 page dated Apr. 3, 2012.

"TradeMotion Online Automotive Parts Catalog Software and E-Commerce Solutions", http://www.trademotion.corn/en/Products/eCatalog-Solution.shtm, pp. 1 and 2 dated Apr. 3, 2012.

"FCC OET Authorization Search", https://apps.fcc.gov/oetcf/eas/reports/GenericSearch.cfm, pp. 1 and 2 dated Apr. 3, 2012.

* cited by examiner

TPMS MANAGER™
*The Industry's TPMS Management System*

Vehicle Report

Replacement Sensors for: TRW 15825475

2007 Chevy Tahoe *edit*

Filter Results | Show Columns | compare to OE

Selected Vendors (4)

| | PART # | MANUFACTURER/DISTRIBUTOR | SENSOR TYPE | PART DESIGN | VALVE MATERIAL | CATEGORY |
|---|---|---|---|---|---|---|
| ☐ | 20158 | Schrader Airware | Clamp-in | 1 Piece | Aluminum | OEM Interchange |
| ☐ | SE53007 | Siemens VDO | Clamp-in | 2 Piece | Aluminum | OEM Interchange |
| ☐ | 15921013 | Siemens | Clamp-in | 2 Piece | Aluminum | OE Interchange |
| ☐ | 1528606 | Schrader Electronics | Clamp-in | 1 Piece | Aluminum | OE Interchange |

Additional Compatible Sensors (10)

| | PART # | MANUFACTURER/DISTRIBUTOR | SENSOR TYPE | PART DESIGN | VALVE MATERIAL | CATEGORY |
|---|---|---|---|---|---|---|
| ☐ | 1047 | Dill Air Controls | Clamp-in | 2 Piece | Aluminum | OEM Interchange |
| ☐ | SH013 | Orange Electronic | Clamp-in | 2 Piece | Aluminum | Aftermarket |
| ☐ | SC8006 | Orange Electronic | Clamp-in | 2 Piece | Aluminum | Aftermarket |
| ☐ | OSC0158 | ORO-TEK | Clamp-in | 2 Piece | Aluminum | Aftermarket |
| ☐ | 7001 | Continental Redi-Sensor | Clamp-in | 2 Piece | Aluminum | Universal |
| ☐ | 17.40028 | 31Inc Smart Sensor | Clamp-in | 2 Piece | Aluminum | Programmable |
| ☐ | SC4104 | Orange Electronic | Clamp-in | 2 Piece | Aluminum | Aftermarket |
| ☐ | 92-1011 | NAPA | Clamp-in | 1 Piece | Aluminum | Aftermarket |
| ☐ | 21070 | Myers Tire | Clamp-in | 1 Piece | Aluminum | OEM Interchange |

- Vehicle Relearn
- TPMS Scan Tool
- Current Sensor
- Replacement Sensor
- Service Kit

Save Report

Print & Save

Additional Information
2007 Chevy Tahoe Owners Manual - TPMS Information Sections *(pdf)* View
NHTSA TSB Summary Data for 2007 Tahoe *(pdf)* View
Download Adobe Reader »

HELP

SYSTEM AND METHOD FOR IDENTIFYING A COMPONENT FOR A TIRE PRESSURE MONITORING SYSTEM

BACKGROUND OF THE INVENTION

Systems have been developed to monitor, for example, vehicle tire pressure, and to report the tire pressure to a receiver at a central monitoring station using radio transmissions. A typical remote automotive tire monitoring system includes a plurality of tire-based sensory transponders and a central, vehicle-based arrangement. The sensory transponders include a component that senses a tire condition, such as tire inflation pressure or tire temperature. Each transponder is capable of outputting a coded transmission that conveys sensed tire condition information and an identifier for reception by the vehicle-based arrangement. Within the vehicle-based arrangement, an electronic control unit ("ECU") processes the conveyed information and controls provision of information regarding the sensed tire conditions to a vehicle operator. During operation of such a system, the vehicle operator is readily notified of a current tire condition, such as a low inflation pressure in a tire.

The Tire Industry Association (TIA) produces an annual Tire Pressure Monitoring System (TPMS) application and relearn guide. It provides an Original Equipment Manufacturer (OEM) part number, three aftermarket alias numbers and the relearn process in brief. What it does not provide are the vehicle exceptions, such as alloy wheels, steel wheels, high line system, low line system, or any parts supercessions within the OE number. While listing three aliases, it does not provide the other ten alias parts from other manufacturers. It does not match the service components to these items. It does not define the specific requirement in detail for system relearn. It does not match tool manufacturer, compatibility and process required to relearn the TPMS system. This limited listing of information only adds to the number of catalogs that produce partial information for the TPMS service cycle.

Simply, a GM dealer cannot service a TPMS of a Nissan due to lack of know how, parts and tooling. Many tire shops have avoided TPMS service due to the lack of information. If a company services a tire, they must service a TPMS. The growth of new technology only adds to the complexity and the population of parts.

SUMMARY OF THE INVENTION

The invention solves a huge problem that exists in the automotive industry related to TPMS by providing a system and method that simplifies a multi-catalog, multi-parts and multi-information source process to identify TPMS parts, parts aliases, parts suppressions, parts interchanges, parts service components, vehicle TPMS relearn processes and TPMS scan tool compatibility. This is achieved through a software "wizard" walk-through software program that incorporates images, text, videos and multiple filters that allow the user to complete the process with accuracy.

In one aspect of the invention, a method for identifying a component of a Tire Pressure Monitoring System (TPMS) to be replaced for a vehicle of interest comprises identifying an Original Equipment Manufacturer (OEM) component or an equivalent component for the vehicle of interest by inputting a group of subsets into a graphical user interface (GUI) of a Tire Pressure Monitoring System (TPMS) Manager software program.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While various embodiments of the invention are illustrated, the particular embodiments shown should not be construed to limit the claims. It is anticipated that various changes and modifications may be made without departing from the scope of this invention.

FIG. 3 shows a screen display for the Quick Search and Advanced Search option;

FIG. 4 shows a screen display of a Vehicle Report using the Quick Search option of FIG. 3;

FIG. 5 shows a screen display of a Vehicle Report of a Relearn procedure selected by the user in the screen display of FIG. 4;

FIG. 6 shows a screen display of a Vehicle Report of replacement sensors selected by the user in the screen display of FIG. 4;

FIG. 8 shows a list of subsets of the Advanced Search option of the invention;

FIGS. 15 and 16 show a Vehicle Report screen display of a compatible scan tool for the OEM component or equivalent component identified by the system and method of the invention; and FIG. 17 shows a track report of a cause/failure analysis of the OEM component or equivalent component produced by the TPMS Manager software program of the invention.

DETAILED DESCRIPTION OF THE INVENTION

Figure 1:
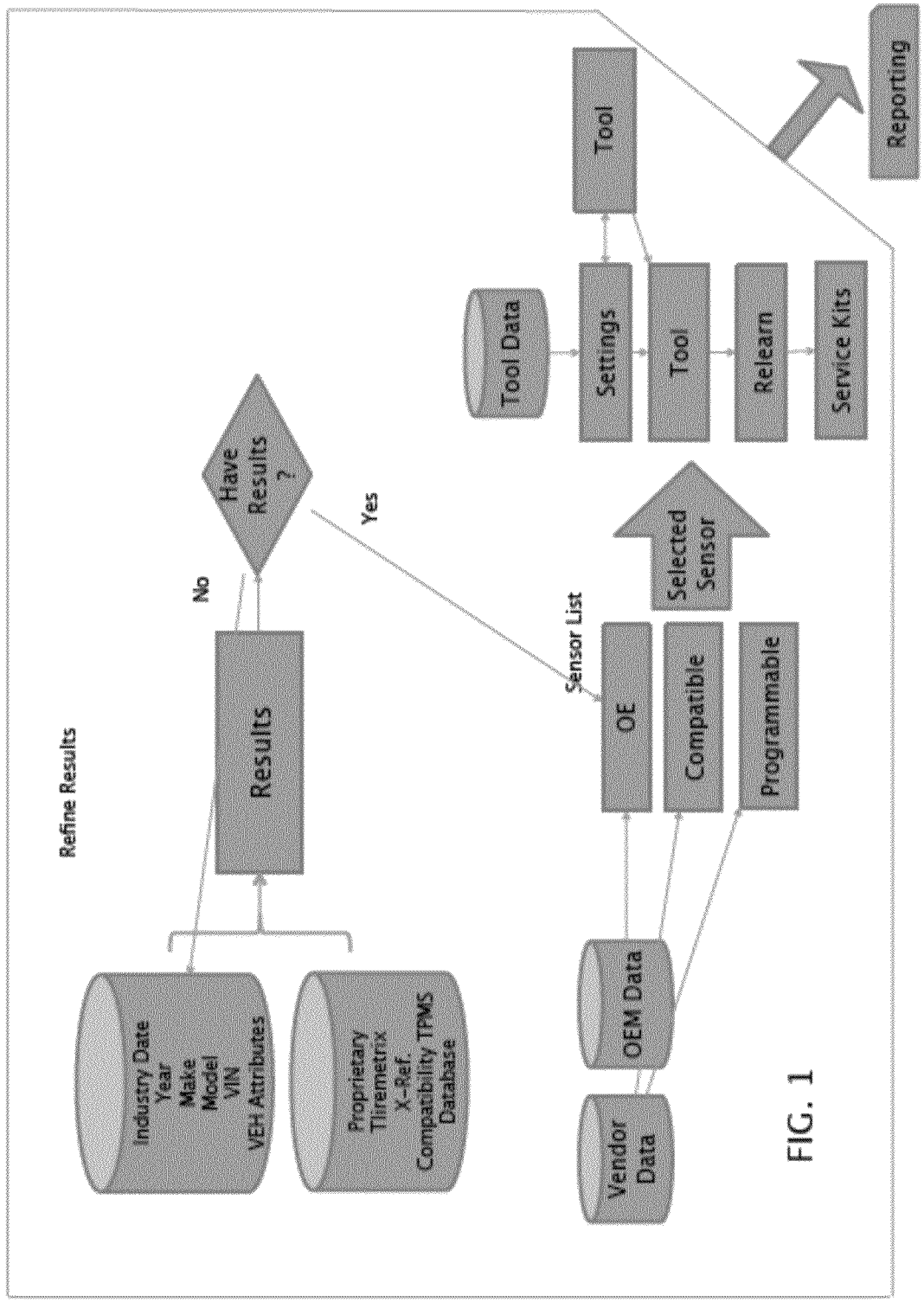
FIG. 1 is a basic flowchart showing the system and method for identifying a component of a Tire Pressure Monitoring System (TPMS) to be replaced for a vehicle of interest comprising identifying an Original Equipment Manufacturer (OEM) component or an equivalent component for the vehicle of interest according to an embodiment of the invention.
Figure 2:
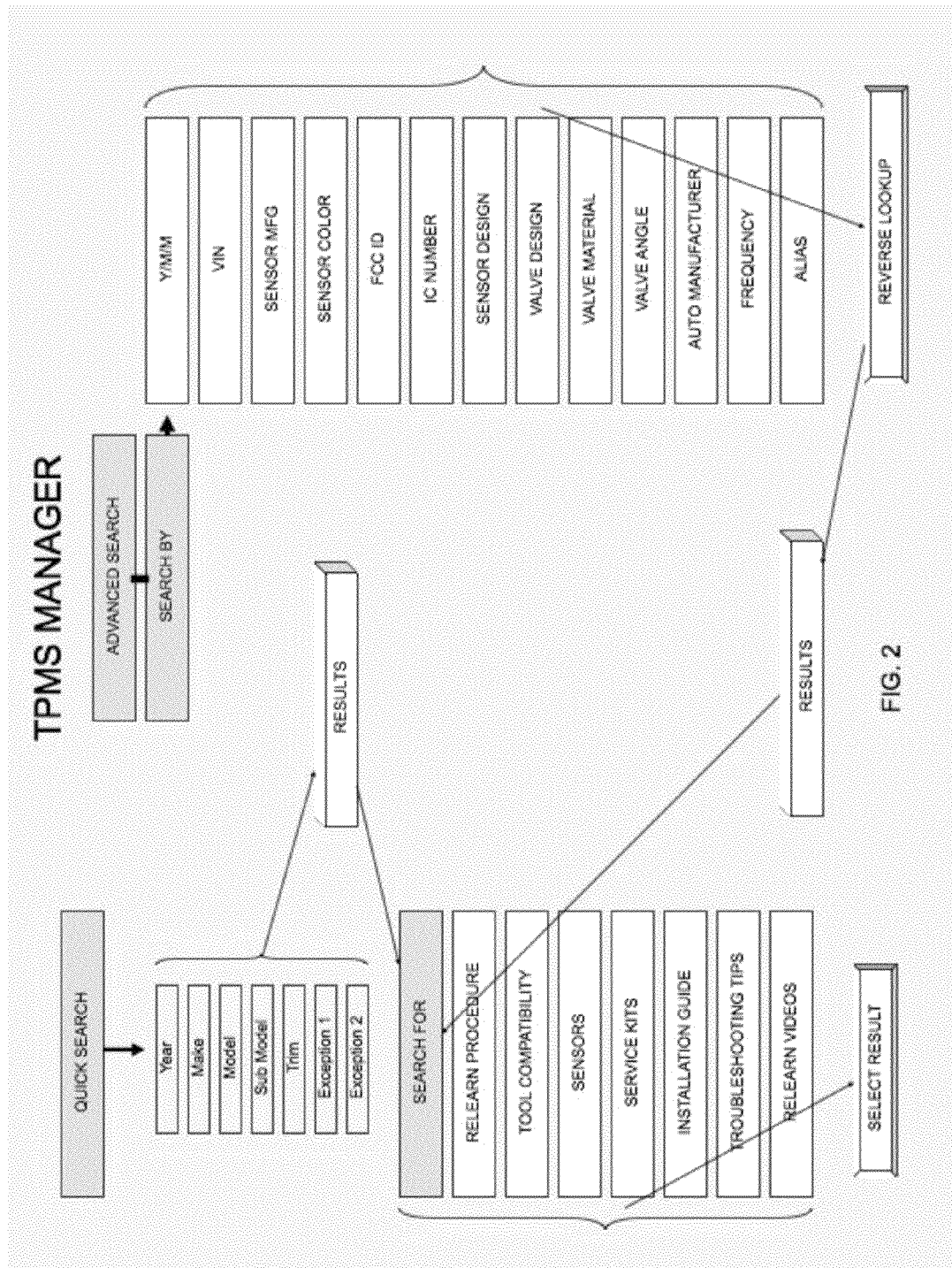
FIG. 2 is a basic flowchart showing the Quick Search and Advanced Search options using the TPMS Manager Software program of the invention.
Figure 17:
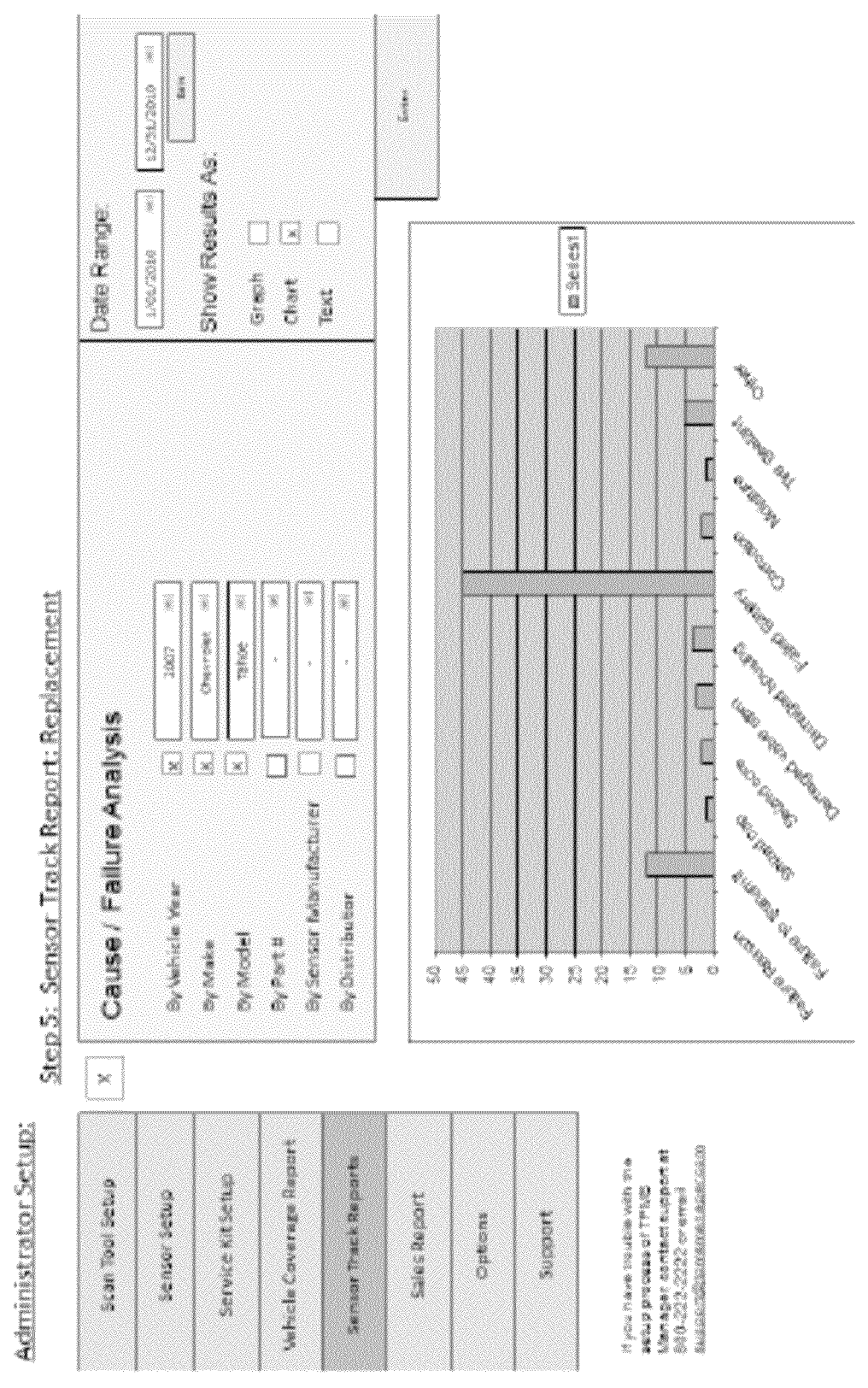

Referring now to FIGS. 1 and 2, basic flowcharts of the system and method is shown according to an embodiment of the invention. In general, the system and method of the invention determines a proper environment for a TPMS sensor for a vehicle of interest, i.e., determining whether a particular sensor is compatible with the actual sensor taken from the vehicle. If not, then the invention allows a user to program a generic sensor with a programming tool. The invention also enables the user to re-program the vehicle in a relearn process so that the vehicle is safe to drive with the replacement TPMS sensor. In addition, the invention provides a sensor track feature that tracks the reason(s) why the sensor taken from the vehicle of interest has failed, thereby providing valuable fault diagnostics tool for the tire industry (FIG. 17).

The system and method identifies TPMS parts, parts aliases, parts suppressions, parts interchanges, parts service components, vehicle TPMS relearn processes and TPMS scan tool compatibility. This is achieved through a TPMS software program "wizard" walk-through that incorporates images, text, videos and multiple filters that allow the user to complete the process with accuracy by accessing a TPMS Manager database, which is the driver behind the value and usefulness of the information presented to a user through a graphical user interface (GUI). The content population of the TPMS Manager database comprises data tables that include the following general categories: 1) Vendors; 2) Vehicles; 3) Service tools; 4) original equipment (OE) Sensors; 5) Interchanges and Aftermarket Sensors; 6) Service Kits; and 7) Service Kit Components. The database population details are given in the Appendix attached hereto.

Search for OEM Part

There are basically two types of searches for an original equipment manufacturer (OEM) part that can be performed by the user: 1) a Quick Search, and 2) an Advanced Search.

Quick Search

Figure 3:
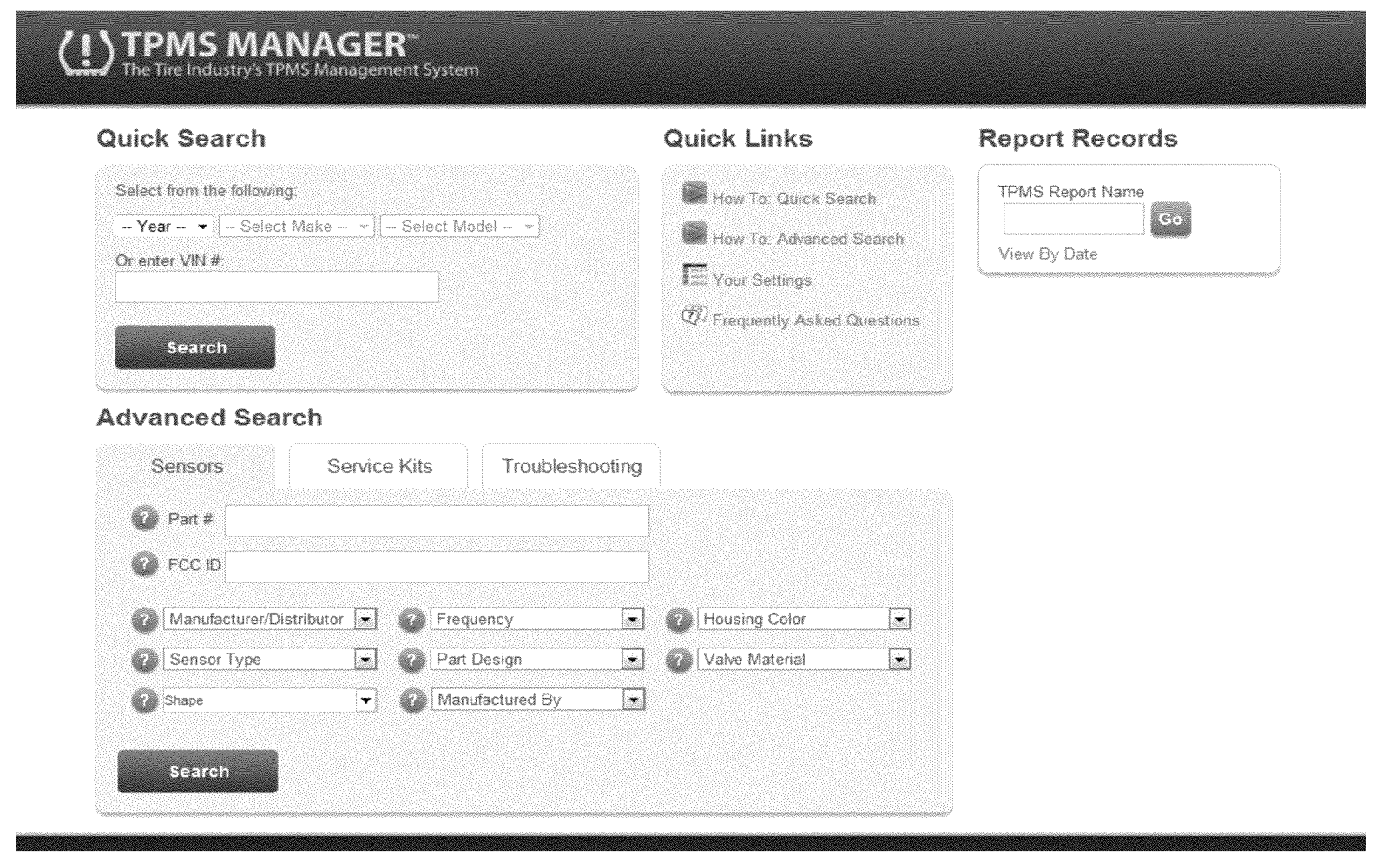

As shown in FIGS. 2 and 3, a user can perform a Quick Search of the TPMS Manager database by entering a group of subsets into the GUI of the TPMS software program. For Quick Search, these subsets includes the Year, Make and Model (Y/M/M) for the vehicle of interest. In addition, a group of subsets may need to be input by the user to further determine the exact Original Equipment Manufacturer (OEM) part. These subsets may include, for example, Sub Model, Couple, Sedan, Trim Level (i.e., LX Model), Alloy or Steel wheels, wheel size, MHz, Vehicle system type (High Line/Low Line, valve angle (i.e., 20 degrees or 40 degrees), or other determinants assigned to that vehicle and TPMS sensor.

If the user does not have the vehicle Y/M/M, the same results may be provided based on the input of the Vehicle Identification Number (VIN). This result may, however, require further input to subsets not determined in the VIN, like wheel material or system type.

The TPMS Manager software will execute algorithms for the type of input (Y/M/M or VIN) by the user to determine the following:

1) What are the vehicle requirements for service?
2) Is the scan tool compatible with the vehicle?
3) What is the relearn procedure of the vehicle?
4) Are there any alerts available for this vehicle?

Figure 4:
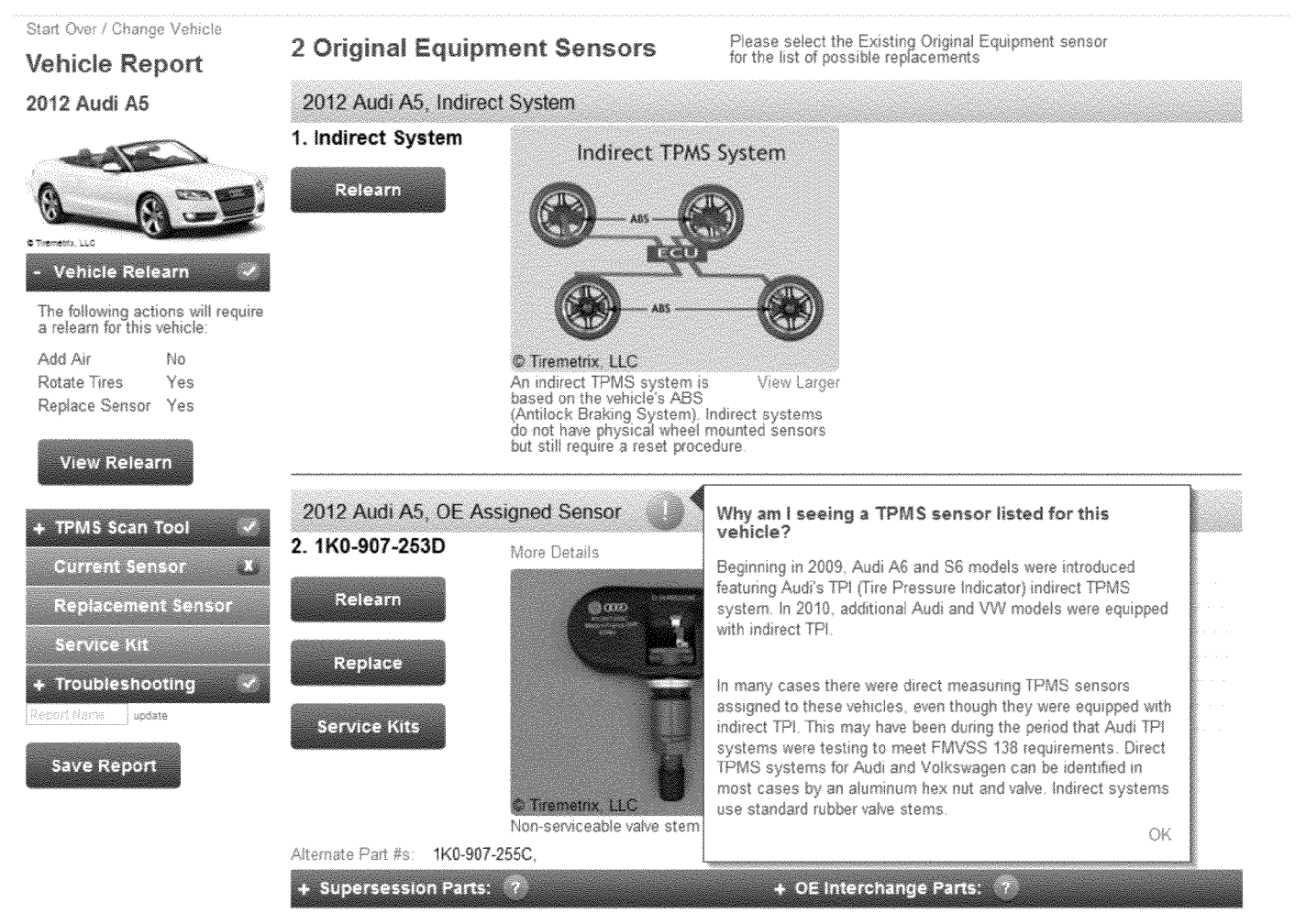

Referring now to FIG. 4, the TPMS Manager stores results from the executed algorithms in a lookup table within the TPMS Manager software program, which is available for users to retrieve at any point in time. The left side of FIG. 4 shows options that can be selected by the user, such as vehicle relearn, service requirements and scan tool compatibility check. The right side of FIG. 4 shows a display of results, such as OEM component(s), supersession component, interchange component, and alias component (alternative part).

By clicking on any of the "Relearn", "Replace" or "Service Kits" buttons, the "1K0-907-253D," for example, would be selected as the current sensor of the vehicle of interest. Clicking on each button yields a different screen of stored results for the vehicle of interest. For example, clicking on the "Relearn" button displays a screen of the stored results shown in FIG. 5. Clicking on the "Replace" button displays a screen of stored results shown in FIG.

Figure 7:
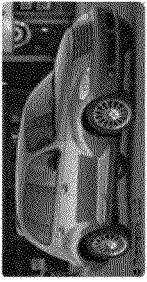
FIG. 7 shows a screen display of a Vehicle Relearn of Service Kits selected by the user in the screen display of FIG. 4.

6. Clicking on the "Service Kits" button displays a screen of stored results shown in FIG. 7.

Advanced Search

The second type of search that can be performed by the user is an Advanced Search. The user selects the Advanced Search option by entering input in the Advanced Search section of FIGS. 2 and 3.

Figure 8:
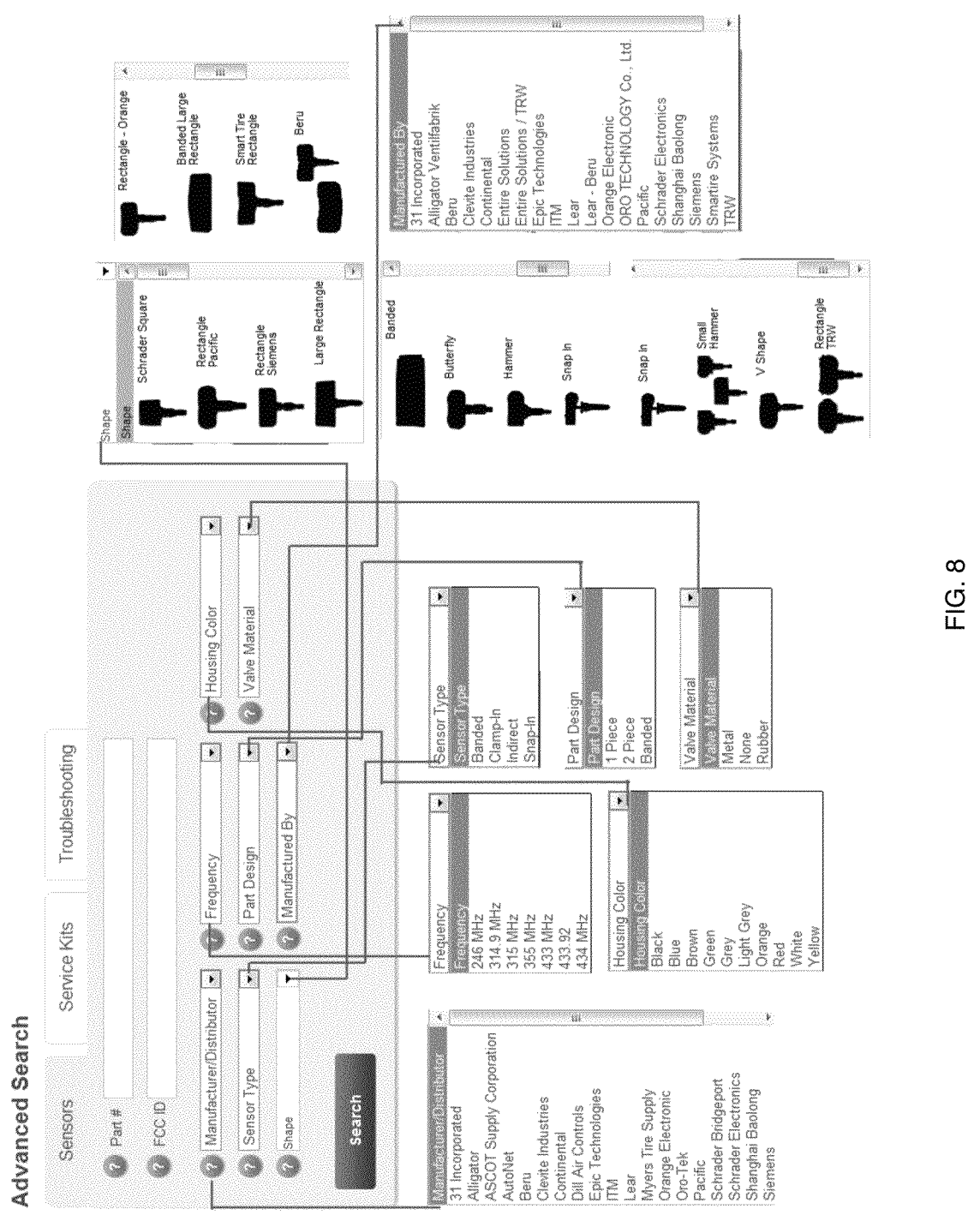
Figure 9:
FIG. 9 shows a screen display of a Vehicle Report of OEM component or equivalent component using the Advanced Search option of FIG. 3.

Here, a user enters any number of subsets into the Advanced Search of the TPMS Manager software program. A full list of each subset is shown in FIG. 8, but at the high level, a user may use one or many combinations of subsets to identify an OEM component. The TPMS Manager software program performs a dominance filtering technique based on "AND" matching. Thus, "Blue" and "Metal" selections would show only "BLUE" and "METAL" sensors. There is no way for a user to use "OR" logic within the query. The Advanced Search option will resolve at the results screen shown in FIG. 9. From this point, the user can navigate the results to select the desired sensor or service kit of interest. The user can also view attributes, images, and any other available data. The final step of Advanced Search is two paths: 1) the user can either save the results, or 2) navigate through selection to begin a new Quick Search. The TPMS Manager software program maintains any selections made in Advanced Search, and the data is carried forward into Quick Search.

Determining a Part

A user may need to determine the application, service requirements or communication of a TPMS sensor without having vehicle information. This may result when a sensor is not functioning and the user has no knowledge of its application, and whether it is a correct part or not. To determine a part in a reverse lookup system, the user enters information through a series of dominance filters.

Figure 10:
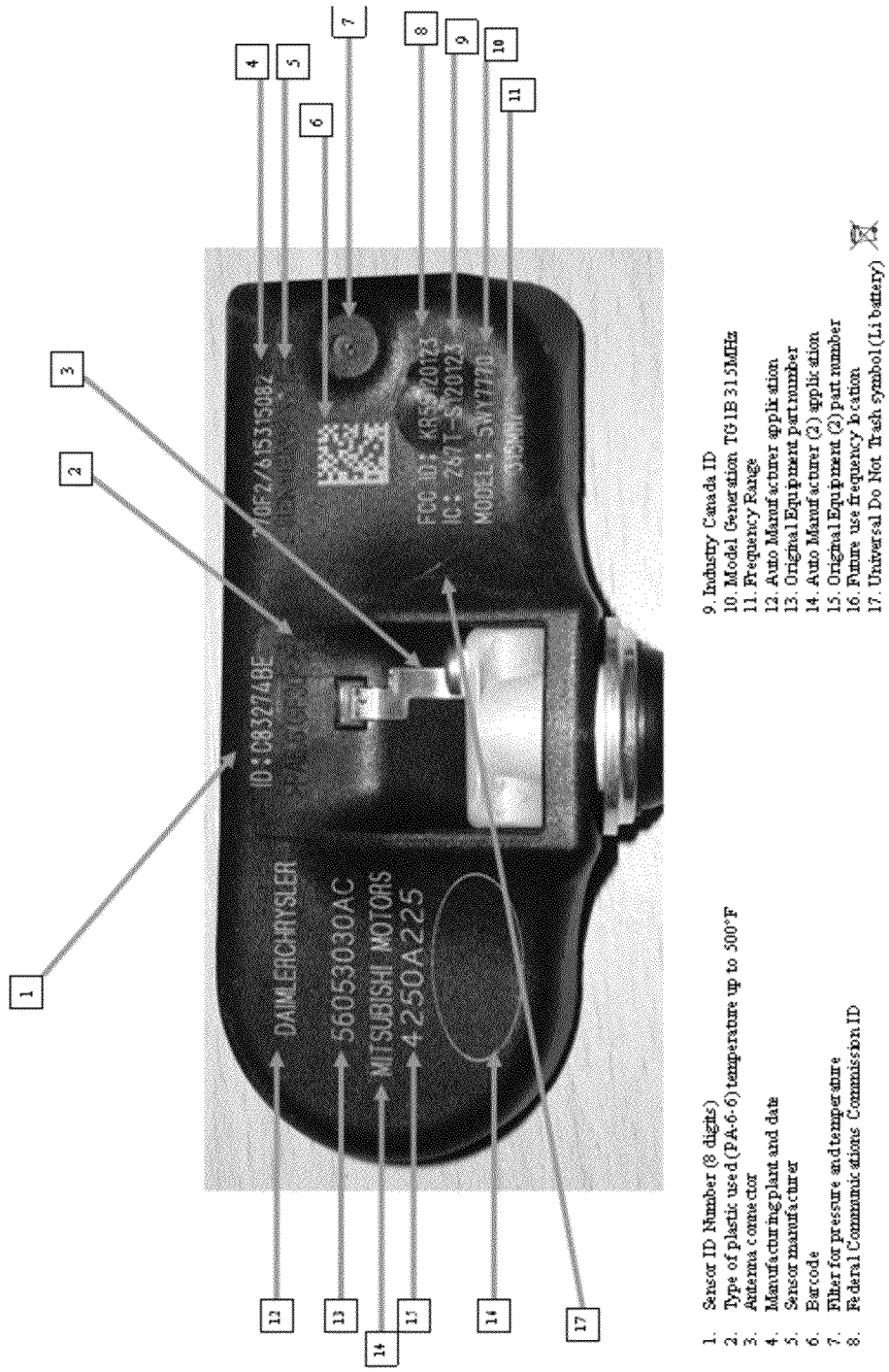
FIG. 10 is a photograph of a TPMS sensor and sensor identification indicia thereon.

A search by color of the sensor, the Federal Communications Commission (FCC) ID number, the Industry Canada (IC) number, the OEM part number on the part (if available), the valve design, whether it is one piece, two piece, rubber or aluminum or a combination of the above-mentioned filters will provide a result that can be traced back to the application, as shown in FIG. 10. This will allow a user located at TPMS service facility, for example, to accurately determine that the TPMS sensor is for a Hyundai vehicle, for example, as opposed to a Honda vehicle. Additionally, many TPMS sensors do not have an OEM part number on them, yet all are required to be labeled with the FCC and IC numbers. As the number of TPMS manufacturers increases in the aftermarket, it is easy to understand the need for parts identification.

Service Requirements of the Selected Part

Figure 11:
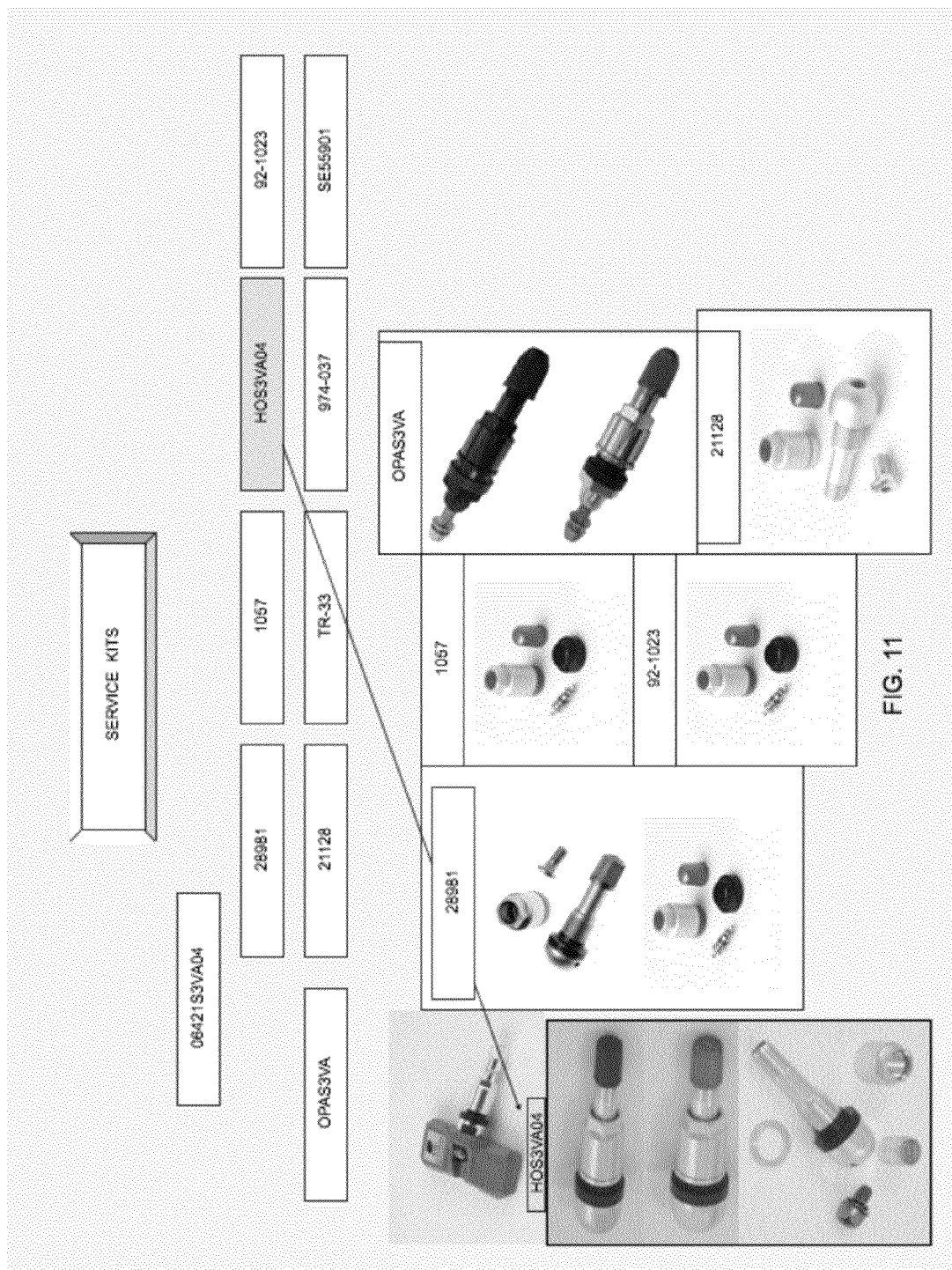
FIG. 11 is a flowchart showing display images from the TPMS Manager software program of service kits available for a OEM component or equivalent component using a dominance filtering technique of the TPMS Manager software program.

It is recommended that a service facility replace some mechanical part of a TPMS sensor when a tire is dismounted for either tire replacement or repair. These TPMS components consist of critical air sealing parts that are unique to each sensor. Matching the correct service part is important for safety reasons because this is the barrier between a highly pressurized tire and sudden air loss. These components consists of an external cap, a valve core, a retaining nut, and a rubberized washer, O-ring or grommet. In some cases, the service kit may or many not include an aluminum valve stem. Once the sensor has been identified, the user can correctly match the service components. Again, the user is allowed to filter and drill down the information to a vendor specific part for that application using the dominance filtering technique of the TPMS Manager software program. These service parts are fragile and contribute to air loss through decomposition of the rubber and/or galvanic corrosion of the parts due to incompatibility of the metals. The user will find clearly and identifiable images and description of the corresponding service parts, as shown in FIG. 11.

Superseding Parts

Figure 12:
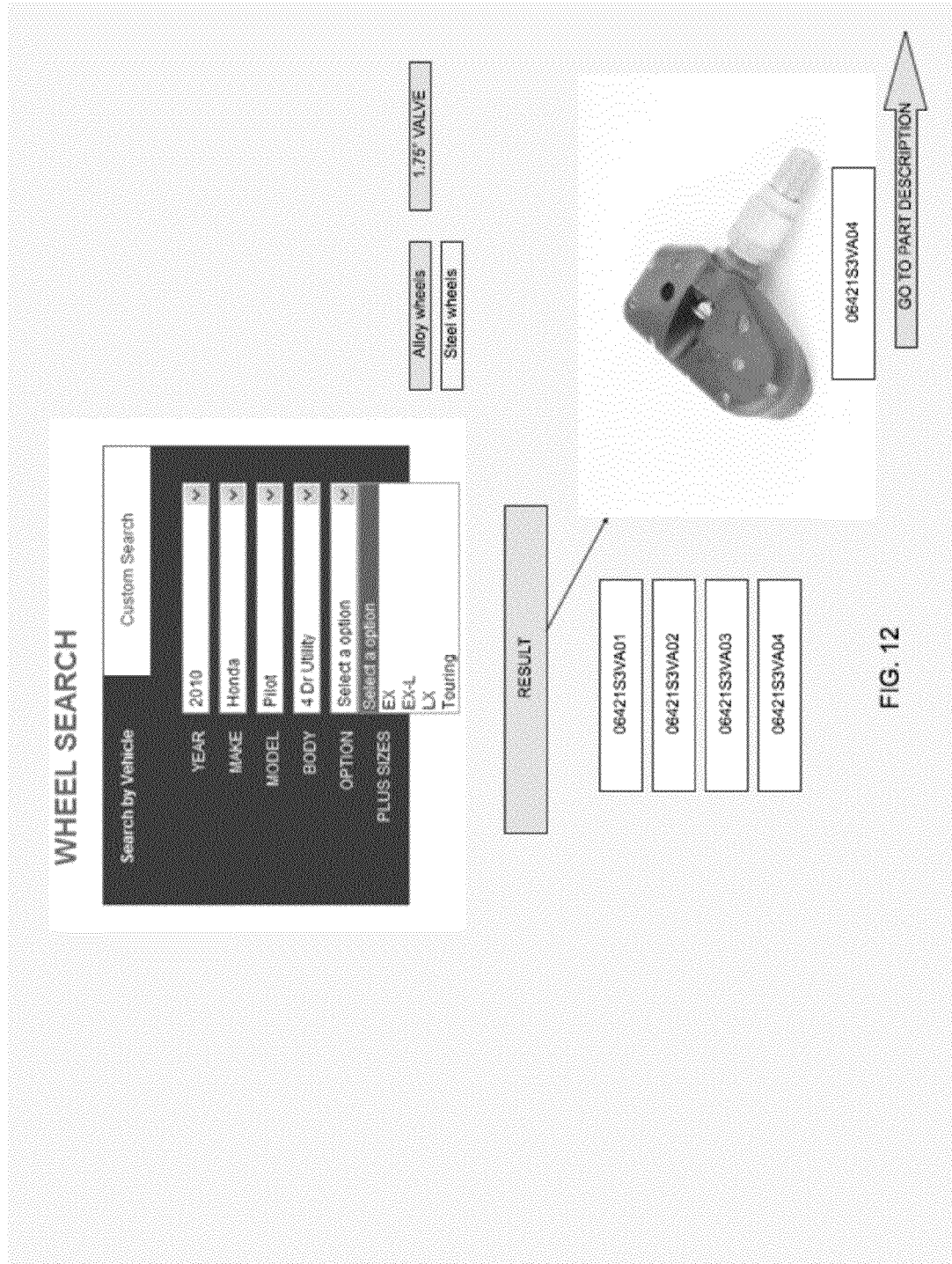
FIG. 12 shows display images from the TPMS Manager software program of a sequence of superseding parts for the OEM component or equivalent component identified by the system and method of the invention.

By entering the Y/M/M, VIN, FCC, IC or filtered description, a user is given a resultant OEM part number. It is very common in the life cycle of an OEM art that future generations of like parts have part number that supersede to a new number. For example, Nissan/Infiniti P/N 40700-JK00A was the factory or "birth" number of a TPMS sensor for a 2008 G35. This part number has superseded to 40700-JK00B, then 40700-JK00C. A typical service facility would not easily understand a vehicle that was equipped with sensors that hat three unique part numbers, yet were identical, except for the P/N. The inventions shows all superseded number in a "chain" related to the birth number. The user will find clearly identifiable images to support and understand the sequence of superseding parts, as shown in FIG. 12.

Alias Parts and Interchange Parts

Figure 13:
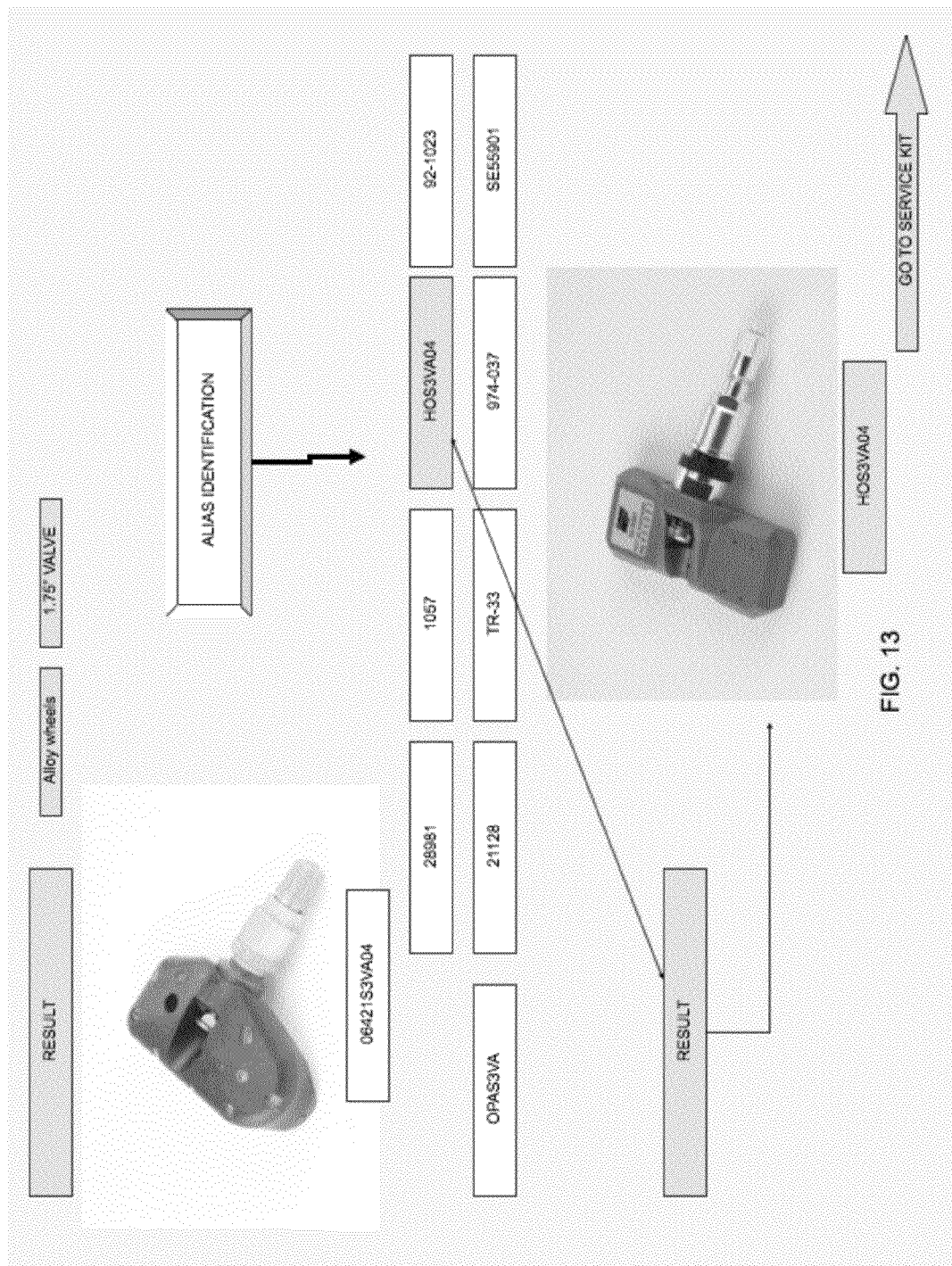
FIGS. 13 and 14 show display images from the TPMS Manager software program of alias and interchange parts for the OEM component or equivalent component identified by the system and method of the invention.
Figure 14:
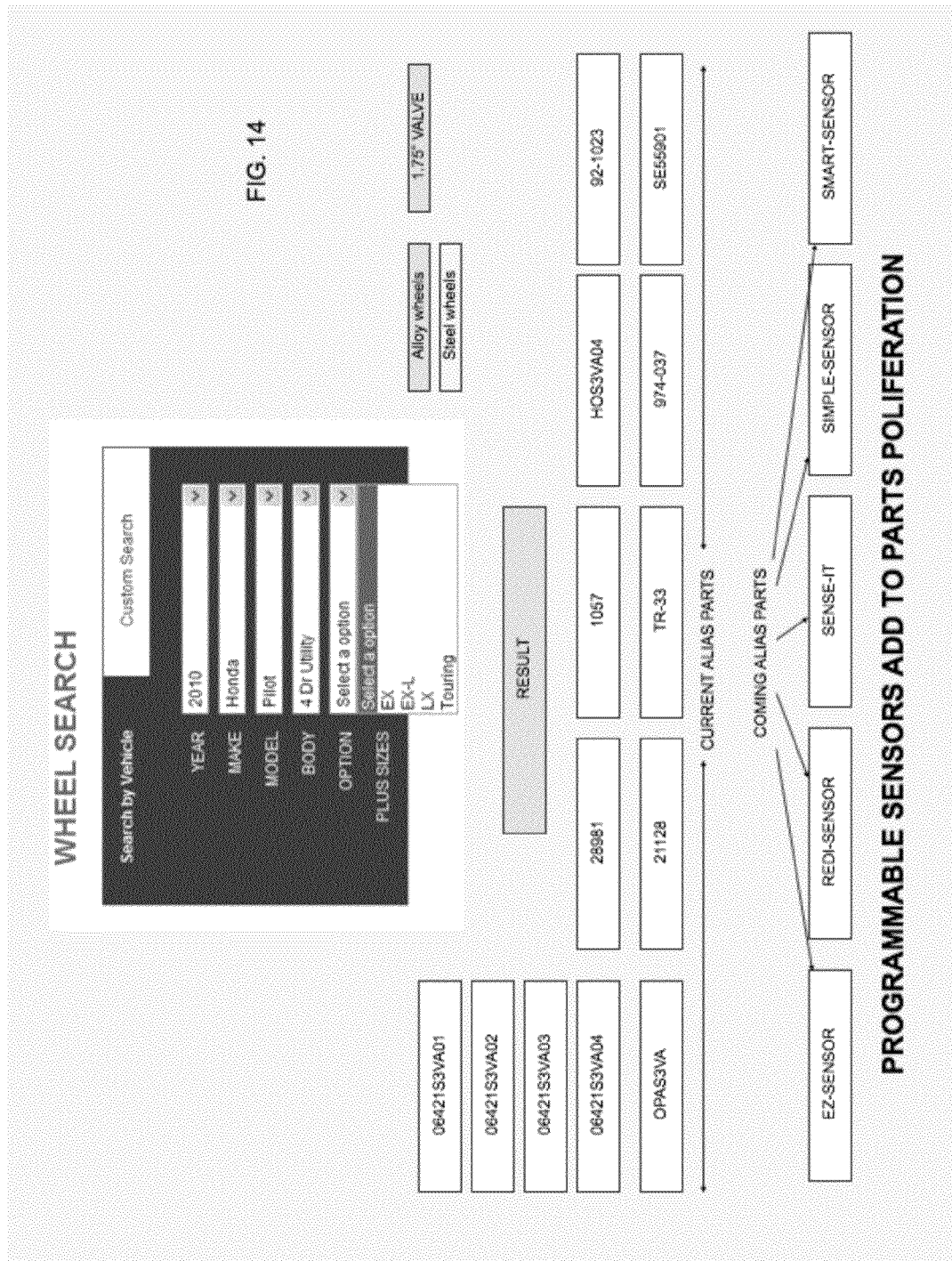

By entering the Y/M/M, VIN, FCC, IC or filtered description, a user is given a resultant OEM part number. It is very common that manufacturers other than the OEM have produced replacement parts for a given application. The invention will provide a directory of Alias or Interchange parts that can be used in place of the OEM part. All alias and interchange parts will be supported by images and detailed descriptions, as shown in FIGS. 13 and 14. An alias part may have a distinctly different design or shape which in turn will require a different service component. The invention ties together all components based on results and selections made by the user. In other words, the invention confirms for the user the answer to the question; "will this part work on this vehicle?."

Vehicle Relearn Procedure

Figure 5:
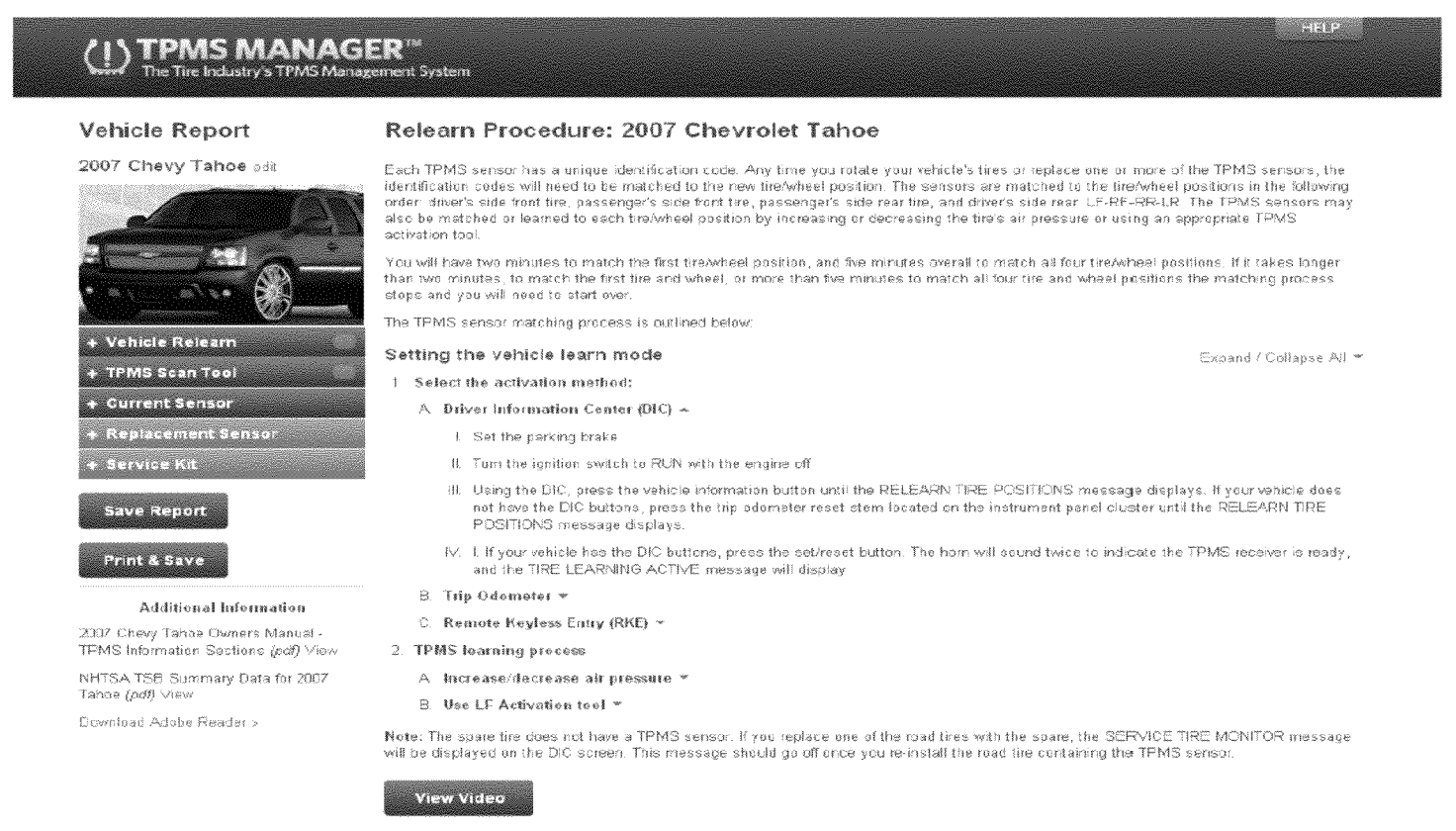

By entering the Y/M/M, VIN or using a reverse lookup to determine the vehicle result, the user will then be shown a RELEARN procedure for the vehicle of interest, as shown in FIG. 5. Every vehicle equipped with a direct measuring TPMS system has a proprietary sequence of events or instructions that must be followed or undertaken to enable the sensor to communicate with the vehicle. Vehicle manufacturers devised their own unique sequence resulting in multiple relearn procedures and multiple exceptions and derivatives of relearn. A relearn is a set of instructions that must be followed. In many cases a scanning and diagnostic tool specified for TPMS must be used. These tools can trigger Low Frequency (LF) signals, collect transmission data and protocols, and embed collected data into the vehicle via and OBD port. In some relearns, a part of the vehicle acts as the initiator. Examples such as the headlamp switch, the key fob, the ignition cycle, the brake pedal, the Drivers Information Center (DIC) and countless other combinations. In some cases, a powerful magnet is required to activate a sensor for relearning. Other systems require some or all of the above AND driving the vehicle a prescribed distance and speed. Lastly, some systems learn automatically without instructions or sequences. These are called "auto-learn" systems. Understanding these instructions and sequences is critical to safely and successfully relearning the TPMS system. The user will find an abbreviated version, as well as a full text version, of each vehicles specific relearn procedure based on vehicle results.

Scan Tool Compatibility

Figure 15:
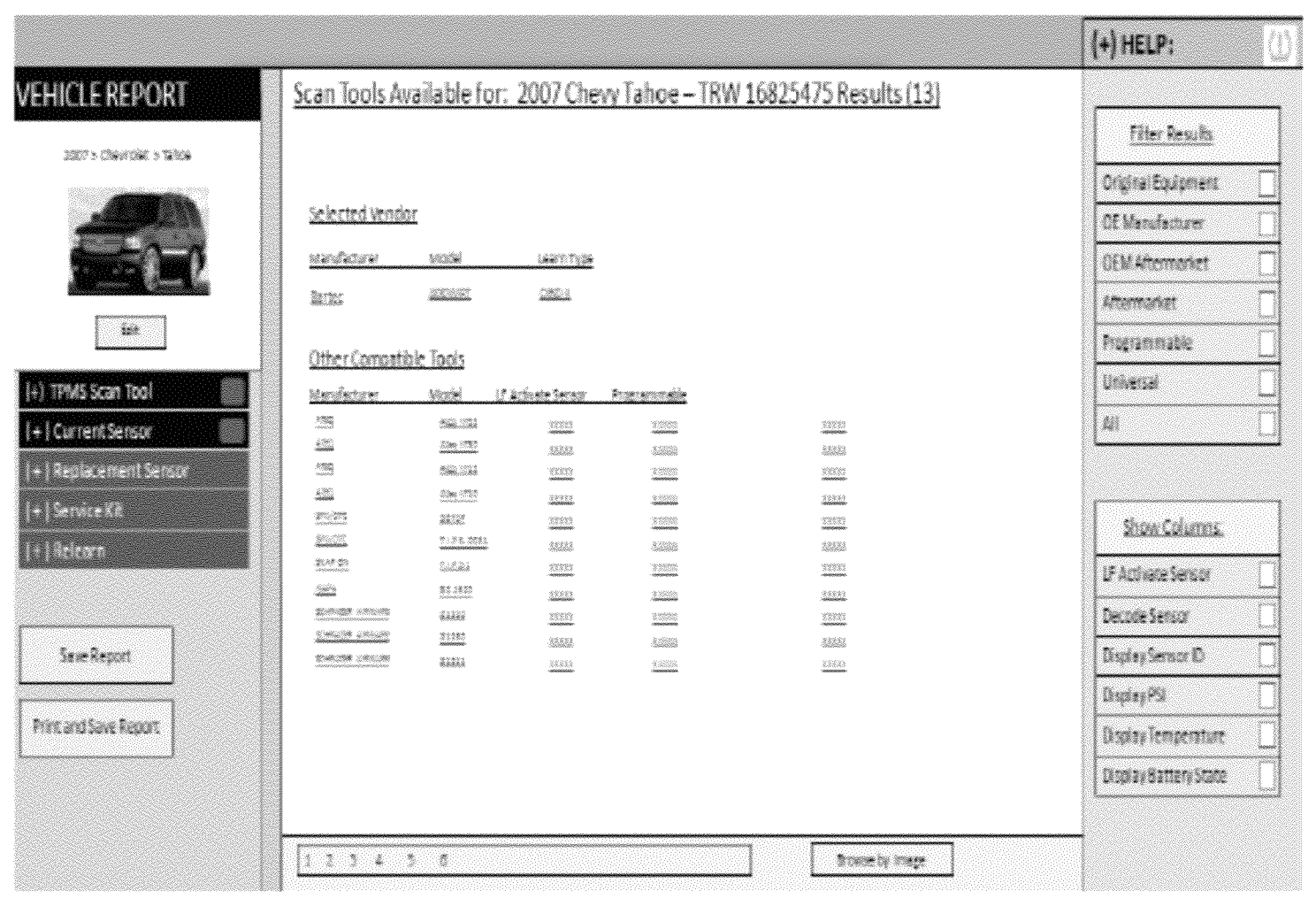
Figure 16:
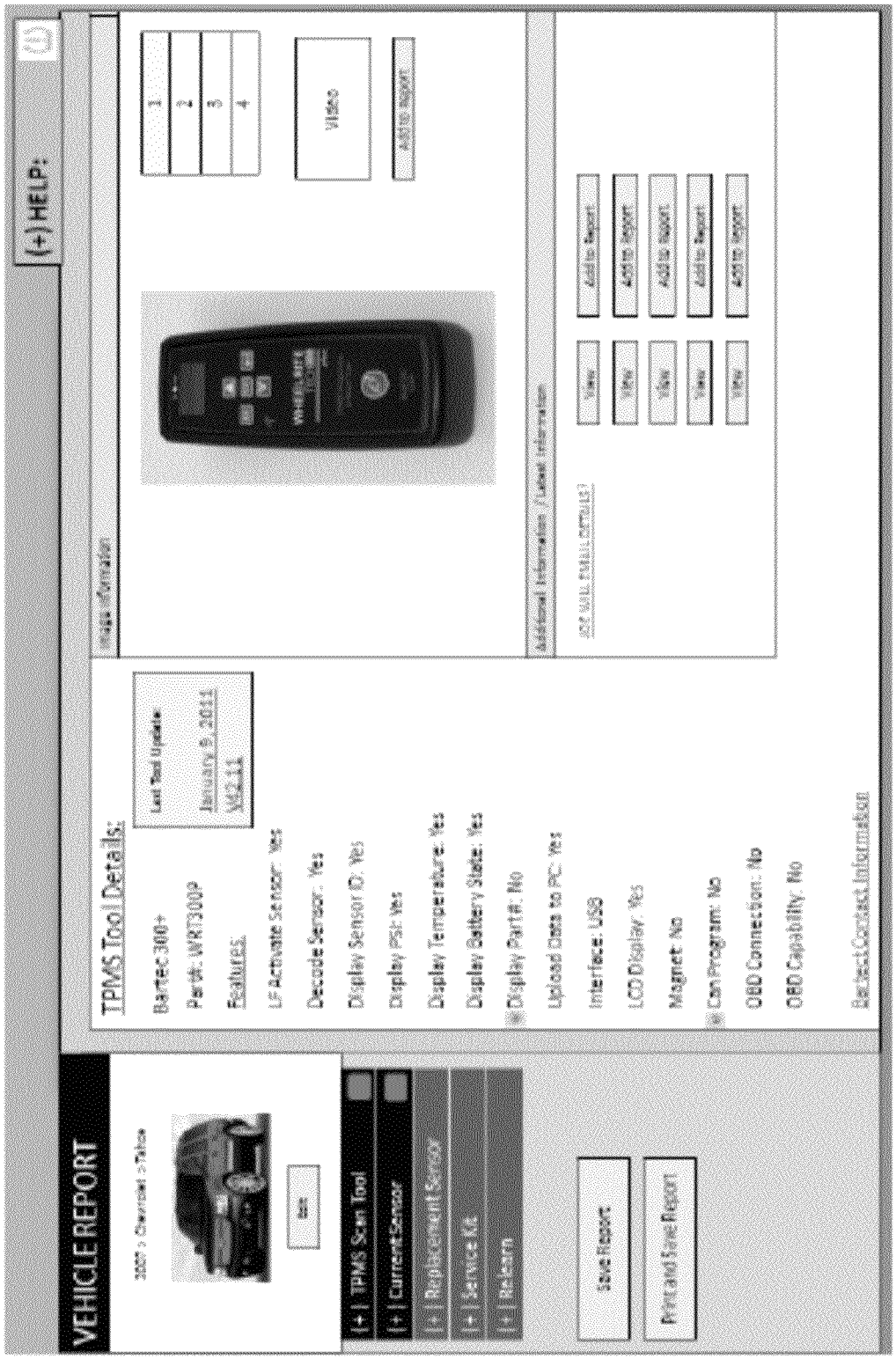

By entering the Y/M/M, the user is shown results related to a scan tools compatibility to perform the relearn where a scan tool is required. A scan tool is required for relearn on a significant percentage of TPMS equipped vehicles. Scan tools vary in complexity size and functionality. A GM dealership will have a proprietary scan tool for just GM vehicles. The same applies to every other car maker out of necessity to service their own brands. In the aftermarket, there are many scan tool manufacturers who have tools that can cover many of the OEM platforms. However as new vehicles and TPMS systems are introduced the aftermarket manufacturers are lagging in adding these applications to their respective scan tool products. It is common that tool manufacturers update their tools, usually via a web browser, every week or month as applications are added. Knowing whether a scan tool currently be used by the user has the capability to perform the scan tool required relearn is a final critical aspect the TPMS service cycle. A service shop that proceeds to repair, install or service a TPMS sensor or system, only to ultimately find out that their scan tool is incapable of performing this final step, will most likely bear the responsibility of paying someone else, perhaps a competitor to perform this relearn. The invention allows a user to check the tool functionality BEFORE performing the work to ensure that a complete cycle of service can be performed, as shown in FIGS. 15 and 16. The results shows the user this result in a yes or no answer. An accompanying video of the relearn using the tool will support the yes result.

User Defined Administrative Setup

The TPMS Manager Software program allows the user to setup administrative information in the TPMS Manager software program as follows:

1. User Name and Configuration
2. TPMS service center locations
3. Preferred Vendor TPMS Scan Tools
4. Preferred Sensor Vendor
5. Preferred Sensor Kit Manufacturers
6. Sensor Track Report: Sales, Replacement, Vehicle Coverage Report
7. Support Results from the Y/M/M driver will populate with only those vendors selected. When a product or selected company has or shows no inventory or no application the user may opt to "show all" within a group.

The architecture of the invention supports an integrated version to tie in with a companies existing inventory and management system. A web-based version supports other or non in house infrastructure methods of use.

The patents and publications referred to herein are hereby incorporated by reference.

Having described presently preferred embodiments the invention may be otherwise embodied within the scope of the appended claims.

What is claimed is:

1. A method for identifying a component of a Tire Pressure Monitoring System for a vehicle of interest comprising:
   identifying a Tire Pressure Monitoring System (TPMS) sensor by performing a Quick Search or an Advanced Search for a vehicle of interest; and
   executing an algorithm to determine a service requirement for a specific component of the TPMS sensor for the vehicle of interest,
   wherein the Quick Search for the vehicle of interest is performed by inputting a year, make and model (Y/M/M) or a vehicle identification number (VIN) for the vehicle of interest into a graphical user interface (GUI) of a Tire Pressure Monitoring System (TPMS) Manager software program, and
   wherein the Advanced Search for the vehicle of interest is performed by inputting one or more subsets comprising one or more identifying attributes of the TPMS sensor or the specific component of the TPMS sensor into the graphical user interface (GUI) of a Tire Pressure Monitoring System (TPMS) Manager software program, and wherein the Advanced Search is based on a dominance filtering technique.

2. The method of claim 1, further comprising executing the algorithm to determine a relearn procedure of the vehicle of interest.

3. The method of claim 1, further comprising executing the algorithm to determine a superceding part for the TPMS sensor or the specific component of the TPMS sensor for the vehicle of interest.

4. The method of claim 1, further comprising executing the algorithm to determine any alerts available for the vehicle of interest.

5. The method of claim 1, wherein the Advanced Search is performed based on "AND" matching for the vehicle of interest.

6. The method of claim 1, further comprising performing a relearn procedure of the vehicle of interest by selecting an activation method and a TPMS learning process to enable the TPMS sensor to communicate with the TPMS of the vehicle of interest.

7. The method of claim 1, further comprising displaying a report to a user of a cause/failure analysis of the TPMS sensor to be replaced.

8. The method of claim 1, further comprising storing results from the algorithm into a lookup table within the TPMS Manager software program for retrieval by a user at any point in time.

9. A computer software program tangibly embodied in a computer readable non-transitory medium that is capable of performing the method recited in claim 1.

10. A method for identifying a component of a Tire Pressure Monitoring System for a vehicle of interest comprising:
    identifying an Original Equipment Manufacturer (OEM) sensor or an equivalent sensor of a Tire Pressure Monitoring System (TPMS) for a vehicle of interest by performing a Quick Search or an Advanced Search; and
    executing an algorithm to determine a service requirement for a specific part of the OEM sensor or the equivalent sensor for the vehicle of interest,
    wherein the Quick Search for the vehicle of interest is performed by inputting a year, make and model (Y/M/M) or a vehicle identification number (VIN) for the vehicle of interest into a graphical user interface (GUI) of a Tire Pressure Monitoring System (TPMS) Manager software program, and
    wherein the Advanced Search for the vehicle of interest is performed by inputting one or more subsets comprising one or more identifying attributes of the OEM sensor or the equivalent sensor of the TPMS into the graphical user interface (GUI) of the Tire Pressure Monitoring System (TPMS) Manager software program, and wherein the Advanced Search is based on a dominance filtering technique.

11. The method of claim 10, further comprising determining a relearn procedure of the vehicle of interest.

12. The method of claim 10, further comprising determining a superceding part for the OEM sensor or the equivalent sensor of the TPMS for the vehicle of interest.

13. The method of claim 10, further comprising determining any alerts available for the vehicle of interest.

14. The method of claim 10, wherein the Advanced Search is performed based on "AND" matching for the vehicle of interest.

15. The method of claim 10, further comprising performing a relearn procedure to enable the OEM sensor or the equivalent sensor to communicate with the TPMS of the vehicle of interest.

16. The method of claim 10, further comprising displaying a report to a user of a cause/failure analysis of the OEM sensor or the equivalent sensor to be replaced.

17. A computer software program tangibly embodied in a computer readable non-transitory medium that is capable of performing the method recited in claim 10.

* * * * *